Aug. 11, 1959    H. KARABIN    2,898,678
SPRING-BIASED SHEAR JOINT
Filed Oct. 15, 1957

INVENTOR.
HARRY KARABIN
BY
Robertson and Youti
ATTORNEYS.

United States Patent Office 2,898,678
Patented Aug. 11, 1959

2,898,678

SPRING-BIASED SHEAR JOINT

Harry Karabin, Philadelphia, Pa.

Application October 15, 1957, Serial No. 690,337

1 Claim. (Cl. 30—269)

This invention relates generally to shears, and is especially concerned with hand shears of the type generally used in barbering.

The particular embodiment of the present invention, which is illustrated in the drawings and which will be described hereinafter in greater detail comprises generally a pair of crossed shearing elements pivotally connected together at their crossing regions, and resilient means urging the crossed elements toward each other under a substantially constant pressure or force.

As is well known to those versed in the art, the stiffness or tightness of the pivot joint in barber's scissors critically affects both the shearing action of the scissors, as well as the ease and effectiveness of operation. Heretofore, it has been conventional to pivotally connect the shearing elements of barber's scissors by a screw extending rotatably through one shearing element and threadedly into the other shearing element; and, adjustment of the relative tightness was effected by tightening or loosening the screw. Unfortunately, the desired degree of tightness was not able to be maintained very long under even normal conditions of use, as pivotal action of the shearing elements tends to effect rotation of the screw and consequent loss of proper adjustment. Sometimes it was the practice to overtighten the screw to forestall the next necessary adjustment, however, this made operation difficult and quickly dulled the shears.

Accordingly, it is an object of the present invention to provide a novel scissors construction which overcomes the above mentioned difficulties, and wherein the tightness or stiffness of the pivotal joint is automatically maintained constant. Of course, this eliminates or substantially reduces the need for adjusting the shears, insures ease of operation and effective cutting action, prolongs the useful life of the scissors, and reduces the frequency of sharpening required.

It is a further object of the present invention to provide a pivot joint construction for scissors having the advantageous characteristics mentioned in the preceding paragraph, which construction is extremely simple and durable, entirely safe and easy to use, and which can be manufactured, sold and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

Figure 1:
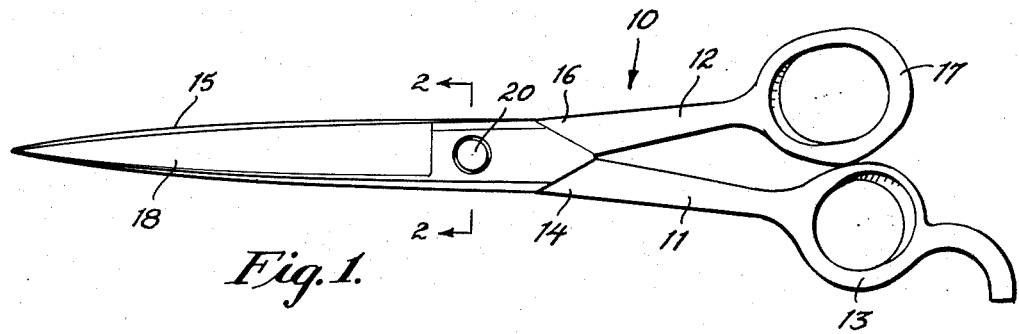
Figure 1 is a plan view showing the barber scissors constructed in accordance with the present invention.

Referring now more particularly to the drawings, the embodiment of the invention illustrated therein is generally designated 10, and includes a pair of shearing elements 11 and 12 arranged in the conventional crossed relation.

The shearing element 11 includes a finger loop or eye 13, from which extends an elongate central region 14. Remote from the loop 13, a cutting element or blade 15 is fixed to the central region 14. Similarly, the shearing element 12 includes an elongate central region 16 having on one end a finger loop or eye 17 adjacent to the finger loop 13 and extending from its other end a blade or cutting element 18 adapted for cooperating shearing action with the blade 15.

Figure 2:
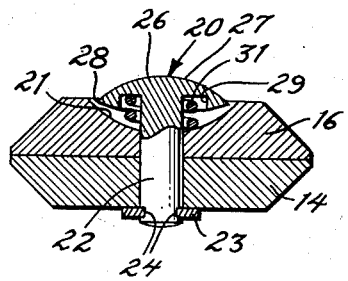
Figure 2 is a transverse sectional view taken substantially along the line 2—2 of Figure 1 and somewhat enlarged for clarity of illustration.
Figure 3:
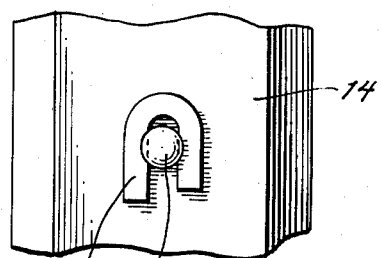
Figure 3 is a partial, enlarged plan view of the scissors of Figure 1 showing the underside of the pivot joint.

The central regions 14 and 16 of the shearing elements 11 and 12 are disposed in facing engagement with each other, see Figure 2, and define the crossing regions of the shearing elements.

A pivot pin, generally designated 20, extends transversely through the crossing regions 14 and 16 to pivotally connect the shearing elements 11 and 12 together. More particularly, the crossing region 16 of the shearing element 12 is provided on its outer surface with an outwardly facing recess 21; and, the pivot 20 includes a shank 22 extending rotatably through the crossing regions 14 and 16 of both shearing elements and into the recess 21. The shank 22 may extend outward beyond the crossing region 14, and is preferably there provided with a retaining element 23 to prevent withdrawal of the shank in the upward direction as seen in Figure 2. In particular, the lower shank end of Figure 2 extending beyond the crossing region 14 may be provided with notches 24, or other suitable retainer receiving means, and a generally U-shaped, preferably resilient retainer 23 has its legs respectively engaged in the notches 24 and in facing engagement with the outer surface of the crossing region 14.

On the other end of the shank 22 of pivot 20, adjacent to the crossing region 16, is an enlargement or head 26. As best seen in Figure 2, the enlarged head 26 is preferably located at least partially within the recess 21, and spaced from the walls or surfaces of the recess. The head 26 is preferably formed on its outward side with a smoothly convex surface 27 which terminates in a peripheral edge 28. The peripheral edge 28 is preferably located within the recess 21, below the outer surface of the crossing region 16 adjacent to the recess, as seen in Figure 2. The underside of the enlarged head 26 is formed with an annular groove 29 which surrounds the shank 22. In the illustrated embodiment, the annular groove 29 may have its inner wall defined by the shank; and, the radially outer wall of the groove 29 is spaced radially inward from the peripheral edge 28 of the head. Thus, the groove 29 opens inward or downward toward the recess 21.

Circumposed about the shank 22 of the pivot or pin 20 is a helically coiled compression spring 31. More specifically, the spring 31 is coiled about the shank 22 adjacent to the head 26 and the recess 21, and has one end received in the groove 29 in bearing engagement with the head or end wall of the groove, and has its other end within the recess 21 in bearing engagement with the surface thereof. Thus, it will now be understood that the spring 31 transmits its resilient force to the crossing region 16 of shearing element 12 by engagement with the wall of recess 21, and also transmits its force through the pivot 20 to the crossing region 14 of the shearing element 11, to thereby constantly urge the shearing elements together under a predetermined resiliently yieldable force.

That is, the facing surfaces of the crossing regions 16 and 14 are held together under the pressure of spring 31, which is substantially constant throughout the useful life of the device, having no tendency to loosen or otherwise lose its adjustment. Further, the spring 31 is advantageously enclosed to prevent the possibility of catching hair; and, as the peripheral edge 28 of the head 26 is located below the outer surface of the crossing region 16, there is no tendency for hair to get into the recess 21 at all. By reason of the slight spacing between the head 26 and the surface of recess 21, it is appreciated that the crossing regions 14 and 16 may move away from each other, as may be necessary under a relatively high shearing load, to thereby prevent undue wear on the blades 15 and 18.

Figure 4:
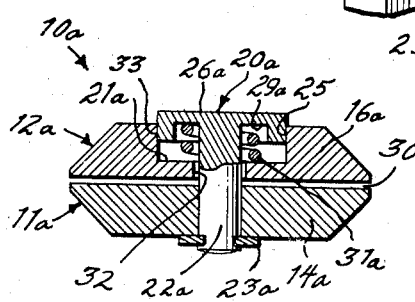
Figure 4 is a transverse sectional view similar to Figure 2, but showing a slightly modified form of the present invention.

Referring now to Figure 4, wherein is illustrated a slightly modified embodiment of the present invention including a shears generally designated 10a of the type wherein the shearing elements 11a and 12a have their central regions 14a and 16a adjacent to the pivot 20a normally spaced apart, as at 30, for greater shearing action of the blade edges. That is, the shears 10a is of the type wherein the shear elements are slightly bowed away from each other in the region of the pivot 20a and held together by the latter to insure effective cutting action of the blades throughout their entire relative movement.

The central or crossing region 16a of the shearing element 12a is provided on its outer surface with an outwardly facing, generally cylindrical recess 21a having a cylindrical side wall 25; and, the pivot 20a includes a shank 22a extending through the crossing regions 14a and 16a of both shearing elements and into the recess 21a. More particularly, the shank 22a of the pivot 20a may extend snugly through the shearing element 11a and preferably loosely through a bore 32 in the shearing element 12a into the recess 21a. The bore 32a is preferably located concentric with respect to the recess 21a. One end of the shank 22a extends outward beyond the shearing element 11a and is there provided with a retaining element 23a to prevent withdrawal of the shank in the upward direction, as seen in the drawing.

On the other or upper end of the shank as seen in the drawing, is an enlargement or head 26a, which is preferably located at least partially within the recess 21a, and spaced from the bottom wall of the recess. The head is formed with an external, generally cylindrical peripheral surface 33 rotatably engageable with the internal cylindrical surface 25 of the recess 21a, to thereby constrain the shear element 16a to substantially pure rotative movement about the axis of the pin 20a.

Formed on the underside of the enlarged head 26a is an annular groove 29a which surrounds the shank 22a. The groove 29a opens inward or downward toward the bottom wall of the recess 21a and may receive one end of a helical compression spring 31a coiled about the shank 22a. That is, the coil compression spring 31a has its opposite ends in respective bearing engagement with the bottom wall of groove 29a and the bottom wall of recess 21a, and thereby transmits its resilient force to the shear elements 11a and 12a to constantly urge the latter toward each other.

From the foregoing, it is seen that the present invention provides a barber's scissors which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claim.

What is claimed is:

A barber's scissors comprising a pair of crossed shearing elements, one of said elements being formed at its crossing region with an outwardly facing recess having a cylindrical internal wall, a pivot pin passing through the crossing regions of said elements and having one end extending into said recess, said pivot pin passing snugly and rotatably through the other of said elements and loosely through said first of said elements, an enlarged head on said one end of said pin located at least partially within said recess and having a cylindrical peripheral wall for snug rotatable reception in said recess, said head being provided with an annular groove extending about said pin facing toward said recess, a retainer on the other end of said pin to prevent withdrawal of the latter from said shearing elements, and a coil spring in said recess surrounding said pin having one end engaging said first shearing element and having its other end engaging in said annular groove to urge said shearing elements toward each other under a constant pressure.

References Cited in the file of this patent

UNITED STATES PATENTS

| | | |
|---|---|---|
| 174,846 | Parker | Mar. 14, 1876 |
| 467,130 | Feinenburg | Jan. 12, 1892 |
| 560,237 | Shultz | May 19, 1896 |
| 619,999 | Sherman | Feb. 21, 1899 |
| 662,468 | Scheerer | Nov. 27, 1900 |
| 705,444 | Richard | July 22, 1902 |
| 805,219 | Mihills | Nov. 21, 1905 |
| 842,113 | Pitts | Jan. 22, 1907 |
| 844,903 | Wilkins | Feb. 19, 1907 |
| 895,444 | Feinenburg | Aug. 11, 1908 |
| 981,436 | Lewis | Jan. 10, 1911 |
| 2,382,341 | Snell | Aug. 14, 1945 |
| 2,469,373 | Feather | May 10, 1949 |
| 2,645,850 | Sejman et al. | July 21, 1953 |
| 2,741,844 | Syman et al. | Apr. 17, 1956 |

FOREIGN PATENTS

| | | |
|---|---|---|
| 3,020 | Great Britain | of 1906 |
| 22,712 | Great Britain | of 1903 |
| 355,156 | Germany | June 22, 1922 |
| 385,396 | Great Britain | Dec. 29, 1932 |